US008901192B2

(12) United States Patent
Kurimura et al.

(10) Patent No.: US 8,901,192 B2
(45) Date of Patent: Dec. 2, 2014

(54) (METH)ACRYLIC RESIN COMPOSITION

(75) Inventors: Hiroyuki Kurimura, Shibukawa (JP); Isamu Ichikawa, Shibukawa (JP); Takayuki Nagumo, Shibukawa (JP); Takako Hoshino, Shibukawa (JP); Jun Watanabe, Shibukawa (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/503,546

(22) PCT Filed: Oct. 20, 2010

(86) PCT No.: PCT/JP2010/068512
§ 371 (c)(1),
(2), (4) Date: Apr. 23, 2012

(87) PCT Pub. No.: WO2011/049138
PCT Pub. Date: Apr. 28, 2011

(65) Prior Publication Data
US 2012/0205043 A1 Aug. 16, 2012

(30) Foreign Application Priority Data
Oct. 22, 2009 (JP) ................................. 2009-243464

(51) Int. Cl.
| C09J 133/10 | (2006.01) |
| C09J 4/00 | (2006.01) |
| C08F 2/50 | (2006.01) |
| C09J 5/00 | (2006.01) |
| C08F 222/10 | (2006.01) |

(52) U.S. Cl.
CPC ... *C09J 4/00* (2013.01); *C08F 2/50* (2013.01); *C09J 5/00* (2013.01); *C09J 133/10* (2013.01); *C09J 2205/31* (2013.01); *C09J 2433/00* (2013.01); *C08F 2222/1026* (2013.01)
USPC .......................................................... 522/36

(58) Field of Classification Search
CPC ............ C09J 4/00; C09J 133/10; C09J 11/06; C08L 33/10; C08F 20/00; C08F 20/20; C08F 2/50
USPC .......................................... 522/36, 39, 64, 69
See application file for complete search history.

(56) References Cited

U.S. PATENT DOCUMENTS

| 2003/0008139 A1 | 1/2003 | Nagamoto et al. |
| 2009/0030107 A1 | 1/2009 | Watanabe et al. |
| 2010/0000670 A1 | 1/2010 | Kurimura et al. |
| 2011/0265934 A1 | 11/2011 | Oshima et al. |

FOREIGN PATENT DOCUMENTS

| CN | 101146837 A | | 3/2008 |
| JP | 63142040 A | * | 6/1988 |
| JP | 3014526 B2 | | 2/2000 |
| JP | 2000-249826 A | | 9/2000 |
| JP | 2000249826 A | * | 9/2000 |
| JP | 2002-338936 A | | 11/2002 |
| JP | 2004-035847 A | | 2/2004 |
| JP | 2004035847 A | * | 2/2004 |
| JP | 2004-285244 A | | 10/2004 |
| JP | 2004285244 A | * | 10/2004 |
| JP | 2006-342222 A | | 12/2006 |
| JP | 3934701 B2 | | 6/2007 |
| WO | 2006/129678 A1 | | 12/2006 |
| WO | 2008/018252 A1 | | 2/2008 |

OTHER PUBLICATIONS

International Search Report of PCT/JP2010/068512, dated Nov. 30, 2010.
Notification of Transmittal of Translation of the International Preliminary Report on Patentability (Form PCT/IB/338) of International Application No. PCT/JP2010/068512 mailed May 24, 2012 with Forms PCT/IB/373 and PCT/ISA/237.

* cited by examiner

*Primary Examiner* — Daniel McNally
(74) *Attorney, Agent, or Firm* — Westerman, Hattori, Daniels & Adrian, LLP

(57) ABSTRACT

Provided is an adhesive (meth)acrylic resin composition being high in adhesiveness and capable of affording an adhered body which can be used at high temperatures of 250° C. or higher, and possessing low outgassing property and heat resistance. A (meth)acrylic resin composition including (A) a polyfunctional (meth)acrylate, and (B) a photopolymerization initiator that exhibits a mass loss on heating of 15% by mass or less when increasing temperature from 30° C. to 250° C. at a temperature increase rate of 10° C./min. under nitrogen flow, wherein the glass transition temperature of a cured body obtained from the composition is 250° C. or higher.

15 Claims, No Drawings

(METH)ACRYLIC RESIN COMPOSITION

TECHNICAL FIELD

The present invention relates to (meth)acrylic resin compositions.

BACKGROUND ART

Photocurable resin compositions, such as ultraviolet light curable resin compositions or visible light curable resin compositions, have heretofore been used often in the production of various electronic components, optical components and optical devices. Patterns of their usage include various patterns such as adhering, potting, coating, sealing, and molding. Known compositions to be used include (meth)acryl-based compositions, epoxy-based compositions, oxetane-based compositions, polyvinyl-based compositions, polyene/polythiol-based compositions, and so on. In particular, (meth)acryl-based compositions are used most frequently; urethane acrylate-based compositions, epoxy acrylate-based compositions, polyester acrylate-based compositions, and so on are used according to application. As far as junction of optical components or optical devices, polyene/polythiol-based compositions are used frequently as well as (meth)acryl-based compositions, such as urethane acrylate-based compositions.

However, with recent improvement in function of optical components and optical devices, the performance and quality which photocurable resin compositions are required to have varied and have reached high level, so that conventional photocurable resin compositions are becoming insufficient. Therefore, various studies are being carried out. Specific examples of performance and quality which photocurable resin compositions are required to have include viscosity suitable for the intended application, low odor, low outgassing, high transparency, high adhesive force, and high heat resistance.

What has recently been needed particularly is heat resistance in production. For example, in surface treatment, partial coating and the like to optical components and optical devices, deposition treatment at high temperatures over 200° C. or baking finish at high temperatures may be performed. Besides electronic components, such as IC, resistors, and inductors, optical components, such as image sensors, have come to be provided with surface mounting to their circuit boards and in such events components are made to pass through solder reflow of high temperature. In recent years, the temperature condition of solder reflow has been becoming stricter particularly with shift to lead-free solders. In such a production process, in order to improve the quality of optical components or optical devices or in order to increase productivity and production yield, parts with use of a photocurable resin composition are required to sufficiently withstand high temperature heating treatment. That is, it is necessary that none of delamination, foaming, cracks, discoloration, etc be caused by high temperature heating treatment.

Moreover, local pollution of components or devices may be caused by outgas formed in the high temperature heating treatment or the characteristics of components and devices may be lowered by outgas formed during steps or use after the components or devices are produced. In particular, with recent reduction in size and increase in precision of optical components and optical devices, the problem of lowering of characteristics caused by outgas have been becoming remarkable.

In view of such current situations, there has been disclosed a photocurable type acrylic adhesive with heat resistance and low outgassing property composed of a polybutadiene compound, a monofunctional (meth)acrylate having an alicyclic group or a linear aliphatic group, a monofunctional (meth)acrylate having a hydroxy group and/or a cyclic ether bond, a monofunctional acrylamide compound, and so on. However, both its heat resistance and low outgassing property are not high enough (see Patent Literature 1).

Moreover, a polyimide-based adhesive superior in delamination adhesion strength has been disclosed as a heat resistant adhesive, but since it will be cured by heating, it takes a long time to cure it, resulting in low productivity (see Patent Literature 2).

Furthermore, there has been disclosed a heat resistant two-main liquid component acrylic adhesive including methacrylic acid, isobornyl (meth)acrylate, and liquid rubber having a polymerizable unsaturated double bond at a terminal thereof. However, both its heat resistance and low outgassing property are not high enough (see Patent Literature 3).

Moreover, as an energy ray-curable resin composition which has high adhesion strength uniformly to various objects to be adhered, which is good in heat resistance and moisture resistance and also is superior in rigidity, and which is low in property to shrink on curing and exhibits less adhesion distortion, there has been disclosed an acryl-based adhesive including a (meth)acrylate having a main chain skeleton that is at least one member selected from the group consisting of polybutadiene, polyisoprene, and hydrogenated products thereof, having at least one (meth)acryloyl group at a terminal or on a side chain of the main chain skeleton, and having a molecular weight of from 500 to 5000, a monofunctional (meth)acrylate having an unsaturated hydrocarbon group of from 2 to 8 carbon atoms, a hydroxy group-containing (meth)acrylate, a polyfunctional (meth)acrylate, a photopolymerization initiator, and an antioxidant, but no description about heat resistance has been made (see Patent Literature 4).

Moreover, an adhesive composition including a polyfunctional (meth)acrylate, a monofunctional (meth)acrylate and a photopolymerization initiator and from which a cured body having a glass transition temperature of from −50° C. to 40° C. can be obtained has been disclosed, but there is no description about an attempt to increase the glass transition temperature of a cured body, thereby attaining sufficient heat resistance (see patent literature 5).

CITATION LIST

Patent Literatures

Patent Literature 1: Japanese Patent Application Laid-Open No. 2006-342222
Patent Literature 2: Japanese Patent No. 3014526
Patent Literature 3: Japanese Patent No. 3934701
Patent Literature 4: WO 2006/129678
Patent Literature 5: WO 2008/018252

SUMMARY OF INVENTION

Technical Problem

The present invention has been accomplished as a result of various studies made in order to solve such problems with conventional technologies, especially, a problem to improve heat resistance and outgassing property.

Solution to Problem

That is, the present invention is, in one aspect, a (meth)acrylic resin composition including (A) a polyfunctional (meth)acrylate, and (B) a photopolymerization initiator that exhibits a mass loss on heating of 15% by mass or less when increasing temperature from 30° C. to 250° C. at a temperature increase rate of 10° C./min. under nitrogen flow, wherein the glass transition temperature of a cured body obtained from the composition is 250° C. or higher.

In one embodiment of the (meth)acrylic resin composition according to the present invention, the polyfunctional (meth) acrylate (A) accounts for 90% by mass or more in the (meth) acrylic resin composition.

In one embodiment of the (meth)acrylic resin composition according to the present invention, the mass loss on heating of a cured body obtained from the (meth)acrylic resin composition is 6% by mass or less when the cured body is left at rest at 300° C. for 10 minutes under helium flow.

In one embodiment of the (meth)acrylic resin composition according to the present invention, from 0.01 to 5 parts by mass of the photopolymerization initiator (B) is contained relative to 100 parts by mass of the polyfunctional (meth) acrylate (A).

In one embodiment of the (meth)acrylic resin composition according to the present invention, the photopolymerization initiator (B) is one or more members selected from the group consisting of 2-hydroxy-1-{4-[4-(2-hydroxy-2-methyl-propionyl)-benzyl]-phenyl}-2-methyl-propan-1-one, 2-benzyl-2-dimethylamino-1-(4-morpholinophenyl)butanone-1,2-dimethylamino-2-(4-methyl-benzyl)-1-(4-morpholin-4-yl-phenyl)-butan-1-one, bis(2,4,6-trimethylbenzoyl) phenylphosphine oxide, 2,4,6-trimethylbenzoyldiphenylphosphine oxide, oxy-phenyl-acetic acid 2-[2-oxo-2-phenyl-acetoxy-ethoxy]-ethyl ester, and oxy-phenyl-acetic acid 2-[2-hydroxy-ethoxy]-ethyl ester.

In one embodiment of the (meth)acrylic resin composition according to the present invention, the polyfunctional (meth) acrylate (A) is one or more members selected from the group consisting of 1,3-adamantyl dimethanol di(meth)acrylate, trimethylolpropane tri(meth)acrylate, isocyanuric acid ethylene oxide modified di(meth)acrylate, isocyanuric acid ethylene oxide modified tri(meth)acrylate, pentaerythritol tri(meth) acrylate, pentaerythritol tetra(meth)acrylate, dimethylolpropane tetra(meth)acrylate, dipentaerythritol penta(meth)acrylate, dipentaerythritol hexa(meth)acrylate, and 1,2-polybutadiene-terminated urethane (meth)acrylate.

In one embodiment of the (meth)acrylic resin composition of the present invention, a polymerization inhibitor (C) is contained.

In another aspect, the present invention is an adhesive composed of the (meth)acrylic resin composition according to the present invention.

In still another aspect, the present invention is a method for producing a adhered body, including putting substrates together using the adhesive according to the present invention, and adhering the substrates to each other by irradiating the adhesive with visible light or ultraviolet light.

In still another aspect, the present invention is a method of using an adhered body, including putting substrates together and adhering the substrates to each other with the adhesive according to the present invention, and then using a resulting adhered body in an environment of 250° C. or higher.

In still another aspect, the present invention is a method for dismantling an adhered body, including irradiating light with a wavelength of 280 nm or longer to an adhered body produced by adhering substrates to each other with the adhesive according to the present invention while heating the adhered body at 150° C. or higher.

In the method for dismantling an adhered body according to the present invention, in one embodiment, the source of the irradiated light is selected from the group consisting of a high pressure mercury lamp, an ultrahigh pressure mercury lamp, a metal halide lamp, a xenon lamp, and a xenon gas-enclosed flash lamp.

Advantageous Effects of Invention

By the use of the (meth)acrylic resin composition of the present invention, a cured product superior in heat resistance and low outgassing property can be obtained.

DESCRIPTION OF EMBODIMENTS

As the polyfunctional (meth)acrylate (A), polyfunctional (meth)acrylate polymers (including oligomers and polymers) having two or more (meth)acryloyl groups at a polymer (including oligomer and polymer) terminal or on a polymer (including oligomer and polymer) side chain and monomers having two or more (meth)acryloyl groups can be used. The polyfunctional (meth)acrylate (A) is not particularly restricted if the glass transition temperature of a cured body is 250° C. or higher. In the present invention, however, the glass transition temperature of a cured body of a resin composition is dominated by the kind and content of the polyfunctional (meth)acrylate. Therefore, in order to control this to 250° C. or higher, it is preferred to use a specific amount of a polyfunctional (meth)acrylate. In a typical embodiment of the present invention, the polyfunctional (meth)acrylate can account for 90% by mass or more in the (meth)acrylic resin composition, and in a more typical embodiment, it can account for 95% by mass or more, e.g., can account for from 90 to 99% by mass.

In the present invention, the glass transition temperature of a cured body of a resin composition is dominated also by the kind of the polyfunctional (meth)acrylate. Therefore, in order to control this to 250° C. or higher, it is preferred to use a polyfunctional (meth)acrylate of a specific component.

Examples of a polyfunctional (meth)acrylate monomer include 1,3-adamantyl dimethanol di(meth)acrylate, trimethylolpropane tri(meth)acrylate, isocyanuric acid ethylene oxide modified di(meth)acrylate, isocyanuric acid ethylene oxide modified tri(meth)acrylate, pentaerythritol tri(meth) acrylate, pentaerythritol tetra(meth)acrylate, dimethylolpropane tetra(meth)acrylate, dipentaerythritol penta(meth)acrylate, and dipentaerythritol hexa (meth)acrylate. These may be used singly or two or more of them may be used.

Examples of a polyfunctional (meth)acrylate polymer include 1,2-polybutadiene-terminated urethane (meth)acrylate (e.g., "TE-2000" and "TEA-1000" produced by Nippon Soda Co., Ltd.), hydrogenated products thereof (e.g., "TEAI-1000" produced by Nippon Soda Co., Ltd.), 1,4-polybutadiene-terminated urethane (meth)acrylate (e.g., "BAC-45" produced by Osaka Organic Chemical Industry Ltd.), polyisoprene-terminated (meth)acrylate, polyester-based urethane (meth)acrylate (e.g., "UV-2000B", "UV-3000B", "UV-7000B" produced by The Nippon Synthetic Chemical Industry Co., Ltd., and "KHP-11", "KHP-17" produced by Negami Chemical Industrial Co., Ltd.), polyether-based urethane (meth)acrylate (e.g., "UV-3700B" and "UV-6100B" produced by The Nippon Synthetic Chemical Industry Co., Ltd.), and bis A type epoxy (meth)acrylate. These may be used singly or two or more of them may be used.

Among polyfunctional (meth)acrylates, one or more members selected from the group consisting of 1,3-adamantyl dimethanol di(meth)acrylate, trimethylolpropane tri(meth)

acrylate, isocyanuric acid ethylene oxide modified di(meth) acrylate, isocyanuric acid ethylene oxide modified tri(meth) acrylate, pentaerythritol tri(meth)acrylate, pentaerythritol tetra(meth)acrylate, dimethylolpropane tetra(meth)acrylate, dipentaerythritol penta(meth)acrylate, dipentaerythritol hexa (meth)acrylate, and 1,2-polybutadiene-terminated urethane (meth)acrylate are preferred in heat resistance and low outgassing property. Among them, one or more members of the group consisting of 1,3-adamantyl dimethanol di(meth)acrylate, pentaerythritol tri(meth)acrylate, trimethylolpropane tri(meth)acrylate, isocyanuric acid ethylene oxide modified di(meth)acrylate, and isocyanuric acid ethylene oxide modified tri(meth)acrylate are preferred in heat resistance and low outgassing property; one or more members of the group consisting of trimethylolpropane tri(meth)acrylate, isocyanuric acid ethylene oxide modified di(meth)acrylate, and isocyanuric acid ethylene oxide modified tri(meth)acrylate are more preferred; and combined use of (A-1) trimethylolpropane tri(meth)acrylate and (A-2) a mixture of isocyanuric acid ethylene oxide modified di(meth)acrylate and isocyanuric acid ethylene oxide modified tri(meth)acrylate is most preferred.

The content of isocyanuric acid ethylene oxide modified di(meth)acrylate in (A-2) the mixture of isocyanuric acid ethylene oxide modified di(meth)acrylate and isocyanuric acid ethylene oxide modified tri(meth)acrylate is preferably from 20 to 50% by mass, and more preferably from 30 to 40% by mass. The combined use ratio of (A-1) and (A-2) expressed in mass ratio is preferably (A-1):(A-2)=(from 3 to 70):(from 97 to 30), more preferably (from 5 to 15):(from 95 to 85).

It is preferred, in heat resistance and low outgassing property, with the photopolymerization initiator (B) to be used in the present invention that when it is heated from 30° C. to 250° C. at a temperature increase rate of 10° C./minute under nitrogen flow, the mass loss on heating be 15% by mass or less, more preferably 8% by mass or less, and most preferably 6% by mass or less. From an economic reason, the mass loss on heating is preferably 0.1% by mass or more, and more preferably 4% by mass or more.

Examples of the photopolymerization initiator (B) include 2-hydroxy-1-{4-[4-(2-hydroxy-2-methyl-propionyl)-benzyl]-phenyl}-2-methyl-propan-1-one, 2-benzyl-2-dimethylamino-1-(4-morpholinophenyl)butanone-1,2-dimethylamino-2-(4-methyl-benzyl)-1-(4-morpholin-4-yl-phenyl)-butan-1-one, bis(2,4,6-trimethylbenzoyl)phenylphosphine oxide, 2,4,6-trimethylbenzoyldiphenylphosphine oxide, oxy-phenyl-acetic acid 2-[2-oxo-2-phenyl-acetoxy-ethoxy]-ethyl ester, and oxy-phenyl-acetic acid 2-[2-hydroxy-ethoxy]-ethyl ester. These may be used singly or two or more of them may be used.

Among them, one or more members selected from the group consisting of 2-hydroxy-1-{4-[4-(2-hydroxy-2-methyl-propionyl)-benzy]-phenyl}-2-m ethyl-propan-1-one, 2-benzyl-2-dimethylamino-1-(4-morpholinophenyl)butanone-1,2-dimethylamino-2-(4-methyl-benzyl)-1-(4-morpholin-4-yl-phenyl)-butan-1-one, bis(2,4,6-trimethylbenzoyl)phenylphosphine oxide, 2,4,6-trimethylbenzoyldiphenylphosphine oxide, oxy-phenyl-acetic acid 2-[2-oxo-2-phenyl-acetoxy-ethoxy]-ethyl ester, and oxy-phenyl-acetic acid 2-[2-hydroxy-ethoxy]-ethyl ester are preferred in heat resistance and low outgassing property; one or more members selected from the group consisting of 2-benzyl-2-dimethylamino-1-(4-morpholinophenyl)butanone-1,2-dimethylamino-2-(4-methyl-benzyl)-1-(4-morpholin-4-yl-phenyl)-butan-1-one, bis(2,4,6-trimethylbenzoyl)phenylphosphine oxide, and 2,4,6-trimethylbenzoyldiphenylphosphine oxide are more preferred; and bis(2,4,6-trimethylbenzoyl)phenylphosphine oxide is most preferred.

The mass loss of a photopolymerization initiator on heating can be expressed, for example, by the ratio (% by mass) of the mass loss at 250° C. to the mass of the photopolymerization initiator at 30° C. when heating the photopolymerization initiator from 30° C. to 250° C. at a temperature increase rate of 10° C./minute under nitrogen flow by using a thermogravimetric analyzer.

The mass loss of a cured body to be obtained from the (meth)acrylic resin composition of the present invention can be expressed, for example, by the ratio (% by mass) of the mass loss after exposure to the mass of a cured body before exposure when a cured body of the (meth)acrylic resin composition is exposed to a temperature of 300° C. for 10 minutes under helium flow by using a thermogravimetric analyzer.

From the viewpoints of low outgassing property and heat resistance, the mass loss of a cured body to be obtained from the (meth)acrylic resin composition of the present invention is preferably up to 6% by mass, more preferably up to 5% by mass, most preferably up to 4% by mass, and even more preferably up to 2% by mass, for example, from 0.1 to 6% by mass.

Cured bodies to be obtained from the (meth)acrylic resin composition of the present invention can have a glass transition temperature of 250° C. or higher. On the other hand, the upper limit of the glass transition temperature can be considered to be 400° C. because the (meth)acrylic resin composition of the present invention will thermally decomposes at about 400° C. and therefore glass transition temperatures exceeding this temperature cannot be measured.

For the measurement of the glass transition temperature of a cured body to be obtained from the (meth)acrylic resin composition of the present invention, a dynamic viscoelasticity spectrum is used. In a dynamic viscoelasticity spectrum, a stress and a distortion are added to the cured body at a fixed temperature increase rate, and the temperature at which a peak top of a loss tangent (hereinafter abbreviates as tan δ) can be defined as a glass transition temperature. When a peak of tan δ does not appear in spite of having increased temperature from a sufficiently low temperature of about −150° C. to a certain temperature (Ta° C.), although the glass transition temperature seems to be −150° C. or lower or to be the certain temperature (Ta° C.) or higher, the glass transition temperature can be considered to be the certain temperature (Ta° C.) or higher because (meth)acrylic resin compositions having a glass transition temperature of −150° C. or lower are unthinkable because of their structure.

As to the amount of use of the photopolymerization initiator (B), the photopolymerization initiator is preferably contained in an amount of from 0.01 to 5 parts by mass relative to 100 parts by mass of the polyfunctional (meth)acrylate (A). If the amount of use of the photopolymerization initiator is 0.01 parts by mass or more, sufficient curability will be obtained, and if it is 5 parts by mass or less, superior low outgassing property and heat resistance will be obtained. In curability, low outgassing property, and heat resistance, it is preferably from 0.1 to 3 parts by mass, more preferably from 0.3 to 2 parts by mass.

The (meth)acrylic resin composition of the present invention can use a monofunctional (meth)acrylate unless the object of the present invention is disturbed. The (meth)acrylic resin composition of the present invention can afford good effects without using monofunctional (meth)acrylates.

The (meth)acrylic resin composition of the present invention can use (C) a polymerization inhibitor in order to improve the storage stability thereof. Examples of the polymerization inhibitor include methylhydroquinone, hydroquinone, 2,2-methylene-bis(4-methyl-6-tertiary-butylphenol), catechol, hydroquinone monomethyl ether, monotertiary-butylhydroquinone, 2,5-ditertiary-butylhydroquinone, p-benzoquinone, 2,5-diphenyl-p-benzoquinone, 2,5-ditertiary-butyl-p-benzoquinone, picric acid, citric acid, phenothiazine, tertiary-butylcatechol, 2-butyl-4-hydroxyanisole, and 2,6-ditertiary-butyl-p-cresol. Among them, 2,2-methylene-bis(4-methyl-6-tertiary-butylphenol) is preferred.

The amount of use of the polymerization inhibitor (C) is preferably from 0.001 to 3 parts by mass, more preferably from 0.01 to 2 parts by mass relative to 100 parts by mass of the (A). If it is 0.001 parts by mass or more, storage stability will be secured, and if it is 3 parts by mass or less, good adhesiveness will be obtained and an uncured state will not occur.

In the (meth)acrylic resin composition of the present invention, a polar organic solvent may be used together.

Unless the object of the present invention is disturbed, the (meth)acrylic resin composition of the present invention may use various elastomers generally used, such as acrylic rubber, urethane rubber, and acrylonitrile-styrene-butadiene rubber, and such additives as inorganic fillers, solvents, extenders, reinforcing materials, plasticizers, thickeners, dyes, pigments, flame retardants, silane coupling agents, and surfactants.

In adhering substrates to each other using the (meth)acrylic resin composition of the present invention, it is preferred to apply visible light or ultraviolet rays with an amount of energy being within the range of from 1 to 8000 mJ/cm$^2$ at a wavelength of 365 nm. When the amount of energy is 1 mJ/cm$^2$ or more, sufficient adhesiveness will be obtained, and when the amount of energy is 8000 mJ/cm$^2$ or less, this will results in superior productivity and decomposition products from the photopolymerization initiator hardly be formed, so that generation of outgas will also be suppressed. In productivity, adhesiveness, and outgassing property, it is preferably within the range of from 100 to 4000 mJ/cm$^2$, more preferably within the range of from 300 to 2000 mJ/cm$^2$.

Although there are no particular restrictions with the substrates to be adhered with the (meth)acrylic resin composition of the present invention, at least one of the substrates is preferably a transparent substrate that allows light to pass therethrough. Examples of such a transparent substrate include inorganic substrates, such as rock crystal, glass, quartz, and calcium fluoride, and organic substrates, such as plastics. Among them, glass and quartz are preferred because they can be used for a wide variety of purpose and can afford a great effect.

In one embodiment, the (meth)acrylic resin composition of the present invention is of a photocurable type and cured bodies thereof can have superior heat resistance. In one embodiment, cured bodies of the (meth)acrylic resin composition of the present invention will generate little outgas even if they are exposed at high temperature and therefore they are suitable for joining, sealing, and coating various optical components, optical devices and electronic components.

Cured bodies of the (meth)acrylic resin composition of the present invention can be used at a high temperature of preferably 200° C. or higher, more preferably of 250° C. or higher, and most preferably of 300° C. or higher. Cured bodies of the (meth)acrylic resin composition of the present invention can be used preferably at 500° C. or lower, more preferably at 400° C. or lower, and most preferably at 350° C. or lower.

Moreover, in one embodiment of the present invention, it is possible to dismantle an adhered body composed of substrates adhered with an adhesive by irradiating it with light of a wavelength of 280 nm or more, typically a wavelength of from 300 to 400 nm while heating it to 150° C. or higher, thereby reducing adhesiveness.

From the viewpoints of dismantlability and degradation of the substrates caused by heating, the temperature of the adhered body at the time of dismantling is preferably within the range of from 150° C. to 300° C., more preferably within the range of from 180° C. to 290° C., and most preferably within the range of from 200° C. to 280° C.

In order to use the radiant heat of irradiated light, it is preferred that one of the substrates does not allow light of 280 nm or more to pass therethrough. The adhered body is heated effectively with absorption of light of 280 nm or more by the substrate.

In one embodiment, the dismantling method of the present invention applies light of a wavelength of 280 nm or more in a fixed energy or more from a substrate side of an adhered body adhered with an adhesive. When good delaminatability can be obtained, the adhered body can be delaminated by hand easily.

The irradiation energy of the light to be applied in the dismantlement, expressed in integrated irradiation of light having a wavelength of 365 nm, is preferably from 1000 to 5000000 mJ/cm$^2$, more preferably from 10000 to 3000000 mJ/cm$^2$, and most preferably from 28000 to 2000000 mJ/cm$^2$. When it is 1000 mJ/cm$^2$ or more, it will become easy to perform dismantlement, whereas if it is 5000000 mJ/cm$^2$ or less, productivity will not be impaired.

The light irradiation source is not particularly restricted and may be a lamp light source, a laser light source, or the like as far as the wavelength of light to be emitted therefrom is 280 nm or more. As such a light irradiation source, any known energy irradiation sources can be used, e.g., a deuterium lamp, mercury lamps (including high pressure mercury lamps that use mercury vapor of 10$^5$ Pa or more, ultrahigh pressure mercury lamps that use mercury vapor of 10$^6$ Pa or more, and low pressure mercury lamps that use mercury vapor of 100 Pa or lower), a xenon lamp, a xenon-mercury hybrid lamp, a halogen lamp, an excimer lamp, an indium lamp, a thallium lamp, an LED lamp, and an electrodeless discharge lamp. Among them, high pressure mercury lamps, ultrahigh pressure mercury lamps, metal halide lamps, xenon lamps, and xenon gas-enclosed flash lamps, which are all large in irradiation energy, are preferred from the viewpoint of the dismantlability of an adhered body.

The method for heating an adhered body is not particularly restricted. It is permitted to use a hot plate, an oven, and the like as a heat source or, alternatively, it is permitted to heat an adhered body with radiant heat emitted by light applied.

EXAMPLES

The present invention is described below in more detail with reference to Examples and Comparative Examples. The present invention is not limited to these Examples.

Example 1

A resin composition was prepared using 100 parts by mass of trimethylolpropane triacrylate ("ARONIX M-309" produced by Toagosei Co., Ltd., hereinafter "M-309") as a polyfunctional (meth)acrylate (A), 1 part by mass of 2-dimethylamino-2-(4-methyl-benzyl)-1-(4-morpholin-4-yl-phenyl)-butan-1-one ("IRGACURE 379" produced by Ciba Japan, hereinafter "IRGACURE 379") as a photopolymerization initiator (B), and 0.1 parts by mass of 2,2-methylene-bis(4- methyl-6-tertiary butylphenol) ("SUMILIZER MDP-S" produced by Sumitomo Chemical Co., Ltd., hereinafter "MDP") as a polymerization inhibitor (C). Results are shown in Table 1.

(Evaluation Method)

Glass Transition Temperature of a Cured Body ("Glass Transition Temperature" in the Tables):

A (meth)acrylic resin composition prepared was sandwiched between PET films using a 1-mm thick silicon sheet as a formwork. The (meth)acrylic resin composition was cured from its upper surface with a black light under conditions defined by an integrated irradiation with a wavelength of 365 nm of 500 mJ/cm² ("integrated irradiation" in the tables) and then cured from the bottom under conditions defined by an integrated irradiation with a wavelength of 365 nm of 500 mJ/cm², whereby a 1-mm thick cured body of the (meth) acrylic resin composition was prepared. The prepared cured body was cut with a cutter into a length of 50 mm and a width of 5 mm, thereby forming a cured body for glass transition temperature measurement. A stress and distortion in the tensile direction at 1 Hz were applied to the resulting cured resin in a nitrogen atmosphere by a dynamic viscoelasticity analyzer "DMS210" manufactured by Seiko Instruments & Electronics Ltd. and tan δ was measured while increasing the temperature from −150° C. to 250° C. at a temperature increase rate of 2° C. per minute; the temperature of the peak top of the tan δ was regarded as a glass transition temperature. The peak top of the tan δ was defined by the maximum value within a region of tan δ being 0.3 or more. When tan δ was 0.3 or less within the region of from −150° C. to 250° C., the peak top of tan δ is considered to be present at 250° C. or higher and the glass transition temperature is considered to be 250° C. or higher.

Mass Loss on Heating of a Cured Body ("Mass Loss on Heating of a Cured Body" in the Tables):

A (meth)acrylic resin composition prepared was sandwiched between PET films using a 5-μm shim plate as a spacer. After curing the (meth)acrylic resin composition from its upper surface under conditions defined by an integrated irradiation with a wavelength of 365 nm of 500 mJ/cm² by a black light, a 5-μm thick cured body of the (meth)acrylic resin composition was prepared. The resulting cured body of 10 mg was left at rest at 300° C. for 10 minutes under helium flow by using a thermogravimetry/differential thermal analyzer "TG-DTA 2000SA" manufactured by Bruker AXS K.K., thereby the mass loss on heating of the resulting cured body was measured. The temperature increase rate until it was left at rest at 300° C. for 10 minutes was adjusted to 10° C./minute.

Mass Loss on Heating of a Photopolymerization Initiator ("Mass Loss on Heating of a Photopolymerization Initiator" in the Tables):

A photopolymerization initiator "IRGACURE 379" of 10 mg was heated from 30° C. to 250° C. at a temperature increase rate of 10° C./minute under a nitrogen flow by using a thermogravimetry/differential thermal analyzer "TG-DTA 2000SA" manufactured by Bruker AXS K.K., thereby the mass loss on heating of the photopolymerization initiator "IRGACURE 379" was measured.

Tensile Shear Adhesion Strength ("Adhesion Strength" in the Tables):

Concretely, using blue glass plates (25 mm×25 mm×0.5 mm in thickness) as objects to be adhered, two blue glass plates were bonded to each other in an adhered portion sized in 25 mm×25 mm with the prepared resin composition, which was then cured under conditions defined by an integrated irradiation with a wavelength of 365 nm of 500 mJ/cm² ("integrated irradiation" in the tables), whereby a specimen for tensile shear adhesion strength measurement was prepared. The tensile shear adhesion strength of the prepared specimen was measured at a tensile rate of 10 mm/minute under an environment defined by a temperature of 23° C. and a humidity of 50% by using a universal tester in accordance with JIS K 6850.

Tensile Shear Adhesion Strength after a 250° C. Heat Resistance Test ("Adhesion Strength after a 250° C. Heat Resistance Test" in the Tables):

Concretely, using blue glass plates (25 mm×25 mm×0.5 mm in thickness) as objects to be adhered, two blue glass plates were bonded to each other in an adhered portion sized in 25 mm×25 mm with the prepared resin composition, which was then cured under conditions defined by an integrated irradiation with a wavelength of 365 nm of 500 mJ/cm² ("integrated irradiation" in the tables) and was exposed for 10 minutes in an oven heated at 250° C., whereby a specimen was prepared. The tensile shear adhesion strength of the prepared specimen was measured at a tensile rate of 10 mm/minute under an environment defined by a temperature of 23° C. and a humidity of 50% by using a universal tester in accordance with JIS K 6850.

Tensile Shear Adhesion Strength after a 300° C. Heat Resistance Test ("Adhesion Strength after a 300° C. Heat Resistance Test" in the Tables):

Measurement was carried out. Concretely, using blue glass plates (25 mm×25 mm×0.5 mm in thickness) as objects to be adhered, two blue glass plates were bonded to each other in an adhered portion sized in 25 mm×25 mm with the prepared resin composition, which was then cured under conditions defined by an integrated irradiation with a wavelength of 365 nm of 500 mJ/cm² ("integrated irradiation" in the tables) and was exposed for 10 minutes in an oven heated to 300° C., whereby a specimen was prepared. The tensile shear adhesion strength of the prepared specimen was measured at a tensile rate of 10 mm/minute under an environment defined by a temperature of 23° C. and a humidity of 50% by using a universal tester in accordance with JIS K 6850.

Delamination/Dismantlement Test (1)

A specimen the same as that for the tensile shear adhesion strength evaluation was prepared and the resulting specimen was exposed for 10 minutes in an oven heated to 300° C. Then, the specimen was irradiated with light from its blue glass plate side in the integrated irradiation given in Table 1 in an illumination of 340 mW/cm² at a wavelength of 365 nm by using a high pressure mercury lamp (instrument used: EYEGRANTAGE ECS-401GX, manufactured by Eye Graphics Co., Ltd.). The tensile shear adhesion strength of the specimen after the irradiation was measured at a tensile rate of 10 mm/minute under an environment defined by a temperature of 23° C. and a humidity of 50% by using a universal tester in accordance with JIS K 6850. The highest temperature of the adhered body in the delamination/dismantlement test was measured by attaching a thermocouple with a Kapton tape to the blue glass plate side to which light was not applied directly. Results of measurement and evaluation are shown in Table 1.

Delamination/Demolition Test (2)

A specimen the same as that for the tensile shear adhesion strength evaluation was prepared and the resulting specimen was exposed for 10 minutes in an oven heated to 300° C. Then, the specimen was irradiated with light from its blue glass plate side in the integrated irradiation given in Table 1 in an illumination of 340 mW/cm² at a wavelength of 365 nm by using a metal halide lamp (instrument used: EYEGRANTAGE ECS-401GX, manufactured by Eye Graphics Co., Ltd.). The tensile shear adhesion strength of the specimen after the irradiation was measured at a tensile rate of 10 mm/minute under an environment defined by a temperature of 23° C. and a humidity of 50% by using a universal tester in accordance with JIS K 6850. The highest temperature of the adhered body in the delamination/dismantlement test was measured by attaching a thermocouple with a Kapton tape to the blue glass plate side to which light was not applied directly. Results of measurement and evaluation are shown in Table 1.

Delamination/Dismantlement Test (3)

A specimen the same as that for the tensile shear adhesion strength evaluation was prepared and the resulting specimen was exposed for 10 minutes in an oven heated to 300° C. Then, the specimen was irradiated with light from its blue glass plate side in the integrated irradiation given in Table 1 in an illumination of 100 mW/cm$^2$ at a wavelength of 365 nm by using a mercury xenon lamp (instrument used: EXECURE 4000, manufactured by HOYA Corporation). In addition, it was heated from the blue glass plate side while the temperature of a hot plate was adjusted to 200° C. The tensile shear adhesion strength of the specimen after the irradiation was measured at a tensile rate of 10 mm/minute under an environment defined by a temperature of 23° C. and a humidity of 50% by using a universal tester in accordance with JIS K 6850. The highest temperature of the adhered body in the delamination/dismantlement test was measured by attaching a thermocouple with a Kapton tape to the blue glass plate side to which light was not applied directly. Results of measurement and evaluation are shown in Table 1.

Delamination/Dismantlement Test (4)

A specimen the same as that for the tensile shear adhesion strength evaluation was prepared and the resulting specimen was exposed for 10 minutes in an oven heated to 300° C. Then, the specimen was irradiated with light of a wavelength of 365 nm from its blue glass plate side in the integrated irradiation given in Table 1 by using a xenon gas-enclosed flash lamp (instrument used: FUV-201, manufactured by USHIO Inc.). The tensile shear adhesion strength of the specimen after the irradiation was measured at a tensile rate of 10 mm/minute under an environment defined by a temperature of 23° C. and a humidity of 50% by using a universal tester in accordance with JIS K 6850. The highest temperature of the adhered body in the delamination/dismantlement test was measured by attaching a thermocouple with a Kapton tape to the blue glass plate side to which light was not applied directly. Results of measurement and evaluation are shown in Table 1.

Delamination/Dismantlement Test (5)

A specimen the same as that for the tensile shear adhesion strength evaluation was prepared and the resulting specimen was exposed for 10 minutes in an oven heated to 300° C. Then, using a xenon lamp (instrument used: SBH-300A manufactured by Inflidge Industrial Ltd.), the specimen was irradiated with light at a distance of 18.5 mm from the lamp, six times for 10 seconds at every time. The tensile shear adhesion strength of the specimen after the irradiation was measured at a tensile rate of 10 mm/minute under an environment defined by a temperature of 23° C. and a humidity of 50% by using a universal tester in accordance with JIS K 6850. The highest temperature of the adhered body in the delamination/dismantlement test was measured by attaching a thermocouple with a Kapton tape to the blue glass plate side to which light was not applied directly. Results of measurement and evaluation are shown in Table 1.

Examples 2 to 19 and Comparative Examples 1 to 4

Operations were carried out in the same manner as in Example 1 except for preparing the resin compositions shown in Tables 1 to 5. The results are shown in Tables 1 to 5.

(Materials Used)
(Component A)

M-309: Trimethylolpropane triacrylate ("ARONIX M-309" produced by Toagosei Co., Ltd.)

A-201: 1,3-Adamantyldimethanol diacrylate ("ADAMANTATE A-201" produced by Idemitsu Kosan Co., Ltd.)

X-M-201: 1,3-Adamantyldimethanol dimethacrylate ("ADAMANTATE X-M-201" produced by Idemitsu Kosan Co., Ltd.)

TMP: Trimethylolpropane trimethacrylate ("LIGHT ESTER TMP" produced by Kyoeisha Chemical Co., Ltd.)

M-313: Mixture of ethylene oxide-modified isocyanurate diacrylate and ethylene oxide-modified isocyanurate triacrylate (content of ethylene oxide-modified isocyanurate diacrylate=30% to 40%) ("M-313" produced by Toagosei Co., Ltd.)

M-315: Mixture of ethylene oxide-modified isocyanurate diacrylate and ethylene oxide-modified isocyanurate triacrylate (content of ethylene oxide-modified isocyanurate diacrylate=3% to 13%) ("M-315" produced by Toagosei Co., Ltd.)

PE-3A: Pentaerythritol triacrylate ("LIGHT ACRYLATE PE-3A" produced by Kyoeisha Chemical Co., Ltd.)

PE-4A: Pentaerythritol tetraacrylate ("LIGHT ACRYLATE PE-4A" produced by Kyoeisha Chemical Co., Ltd.)

M-408: Dimethylolpropane tetraacrylate ("M-408" produced by Toagosei Co., Ltd.)

M-400: Mixture of dipentaerythritol pentaacrylate and dipentaerythritol hexaacrylate (content of dipentaerythritol pentaacrylate=40% to 50%) ("M-400" produced by Toagosei Co., Ltd.)

DPE-6A: Dipentaerythritol hexaacrylate ("LIGHT ACRYLATE DPE-6A" produced by Kyoeisha Chemical Co., Ltd.)

TE-2000: 1,2-Polybutadiene-terminated urethane methacrylate ("TE-2000" produced by Nippon Soda Co., Ltd.)

(Component B)

IRGACURE 379: 2-Dimethylamino-2-(4-methyl-benzyl)-1-(4-morpholin-4-yl-phenyl)-butan-1-one ("IRGACURE 379" produced by Ciba Japan K.K.)

IRGACURE 127: 2-Hydroxy-1-{4-[4-(2-hydroxy-2-methyl-propionyl)-benzyl]-phenyl}-2-methyl-propan-1-one ("IRGACURE 127" produced by Ciba Japan K.K.)

IRGACURE 369: 2-Benzyl-2-dimethylamino-1-(4-morpholinophenyl)butanone-1 ("IRGACURE 369" produced by Ciba Japan K.K.)

IRGACURE 819: Bis(2,4,6-trimethylbenzoyl)phenylphosphine oxide ("IRGACURE 819" produced by Ciba Japan K.K.)

DAROCUR TPO: 2,4,6-Trimethylbenzoyldiphenylphosphine oxide ("DAROCUR TPO" produced by Ciba Japan K.K.)

IRGACURE 754: Mixture of oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester ("IRGACURE 754" produced by Ciba Japan K.K.)

(Component C)

MDP: 2,2-Methylene-bis(4-methyl-6-tertiary-butylphenol) ("SUMILIZER MDP-S" produced by Sumitomo Chemical Co., Ltd.)

(Other Components)

BDK: Benzyl dimethyl ketal ("IRGACURE 651" produced by Ciba Specialty Chemicals)

IB-XA: Isobornyl acrylate ("LIGHT ACRYLATE IB-XA" produced by Kyoeisha Chemical Co., Ltd.)

BZ: Benzyl methacrylate ("LIGHT ESTER BZ" produced by Kyoeisha Chemical Co., Ltd.)

1,6-HX-A: 1,6-Hexanediol diacrylate ("LIGHT ACRYLATE 1,6-HX-A" produced by Kyoeisha Chemical Co., Ltd.)

TABLE 1

|  |  | Example 1 | Example 2 | Example 3 | Example 4 | Example 5 |
|---|---|---|---|---|---|---|
| Component (A) (part(s) by mass) | M-309 | 100 | 100 | 100 | 100 | 100 |
|  | A-201 | — | — | — | — | — |
|  | X-M-201 | — | — | — | — | — |
|  | TMP | — | — | — | — | — |
|  | M-313 | — | — | — | — | — |
|  | M-315 | — | — | — | — | — |
|  | PE-3A | — | — | — | — | — |
|  | PE-4A | — | — | — | — | — |
|  | M-408 | — | — | — | — | — |
|  | M-400 | — | — | — | — | — |
|  | DPE-6A | — | — | — | — | — |
|  | TE-2000 | — | — | — | — | — |
| Component (B) (part(s) by mass) | IRGACURE379 | 1 | — | — | — | — |
|  | IRGACURE127 | — | 1 | — | — | — |
|  | IRGACURE369 | — | — | 1 | — | — |
|  | IRGACURE819 | — | — | — | 1 | — |
|  | DAROCUR TPO | — | — | — | — | 1 |
|  | IRGACURE754 | — | — | — | — | — |
| Component (C) (part(s) by mass) | MDP | 0.1 | 0.1 | 0.1 | 0.1 | 0.1 |
| Other components (part(s) by mass) | BDK | — | — | — | — | — |
|  | IB-XA | — | — | — | — | — |
|  | BZ | — | — | — | — | — |
|  | 1,6-HX-A | — | — | — | — | — |
| Integrated irradiation (mJ/cm2) | — | 500 | 2000 | 1500 | 300 | 50 |
| Glass transition temperature (° C.) | — | 250° C. or higher | 250° C. or higher | 250° C. or higher | 250° C. or higher | 250° C. or higher |
| Mass loss on heating of a photopolymerization initiator (% by mass) | — | 5 | 7.1 | 5.1 | 5.5 | 4.7 |
| Mass loss on heating of a cured body (% by mass) | — | 0.8 | 1.5 | 0.9 | 0.7 | 1.2 |
| Adhesion strength (MPa) | — | 3.3 | 3.9 | 3.5 | 4.5 | 4.8 |
| Adhesion strength after a 250° C. heat resistance test (MPa) | — | 10.8 | 9.7 | 11.1 | 12.1 | 11.6 |
| Adhesion strength after a 300° C. heat resistance test (MPa) | — | 11.2 | 9.5 | 11.5 | 12.6 | 11 |
| (1) High-pressure mercury lamp | Tensile shear adhesion strength after a dismantlement test [MPa] | 0.1 Delaminatable | 0.1 Delaminatable | 0.1 Delaminatable | 0.1 Delaminatable | 0.1 Delaminatable |
|  | Integrated irradiation of a wavelength of 365 nm [mJ/cm2] | 480000 | 390000 | 310000 | 220000 | 420000 |
|  | Highest temperature of an adhered body [° C.] | 296 | 285 | 283 | 215 | 287 |
| (2) Metal halide lamp | Tensile shear adhesion strength after a dismantlement test [MPa] | 0.1 Delaminatable | 0.1 Delaminatable | 0.1 Delaminatable | 0.1 Delaminatable | 0.1 Delaminatable |
|  | Integrated irradiation of a wavelength of 365 nm [mJ/cm2] | 30000 | 350000 | 370000 | 350000 | 350000 |
|  | Highest temperature of an adhered body [° C.] | 295 | 290 | 280 | 280 | 280 |
| (3) Mercury xenon lamp | Tensile shear adhesion strength after a dismantlement test [MPa] | 0.1 Delaminatable | 0.1 Delaminatable | 0.1 Delaminatable | 0.1 Delaminatable | 0.1 Delaminatable |
|  | Integrated irradiation of a wavelength of 365 nm [mJ/cm2] | 350000 | 350000 | 350000 | 350000 | 350000 |
|  | Highest temperature of an adhered body [° C.] | 255 | 265 | 266 | 286 | 255 |
| (4) Xenon gas-enclosed flash lamp | Tensile shear adhesion strength after a dismantlement test [MPa] | 0.1 Delaminatable | 0.1 Delaminatable | 0.1 Delaminatable | 0.1 Delaminatable | 0.1 Delaminatable |
|  | Integrated irradiation of a wavelength of 365 nm [mJ/cm2] | 20000 | 30000 | 1000 | 2500 | 40000 |
|  | Highest temperature of an adhered body [° C.] | 255 | 290 | 160 | 278 | 285 |
| (5) Xenon lamp | Tensile shear adhesion strength after a dismantlement test [MPa] | 0.1 Delaminatable | 0.1 Delaminatable | 0.1 Delaminatable | 0.1 Delaminatable | 0.1 Delaminatable |
|  | Integrated irradiation of a wavelength of 365 nm [mJ/cm2] |  |  |  | — |  |
|  | Highest temperature of an adhered body [° C.] | 295 | 299 | 284 | 276 | 270 |

TABLE 2

|  |  | Example 6 | Example 7 | Example 8 | Example 9 | Example 10 |
|---|---|---|---|---|---|---|
| Component (A) (part(s) by mass) | M-309 | 100 | — | 100 | — | — |
|  | A-201 | — | 100 | — | — | — |
|  | X-M-201 | — | — | — | 100 | — |
|  | TMP | — | — | — | — | 100 |
|  | M-313 | — | — | — | — | — |
|  | M-315 | — | — | — | — | — |
|  | PE-3A | — | — | — | — | — |
|  | PE-4A | — | — | — | — | — |
|  | M-408 | — | — | — | — | — |
|  | M-400 | — | — | — | — | — |
|  | DPE-6A | — | — | — | — | — |
|  | TE-2000 | — | — | — | — | — |
| Component (B) (part(s) by mass) | IRGACURE379 | — | 3 | 5 | 2 | — |
|  | IRGACURE127 | — | — | — | — | 3 |
|  | IRGACURE369 | — | — | — | — | — |
|  | IRGACURE819 | — | — | — | — | — |
|  | DAROCUR TPO | — | — | — | — | — |
|  | IRGACURE754 | 1 | — | — | — | — |
| Component (C) (part(s) by mass) | MDP | 0.1 | 0.1 | 0.1 | 0.1 | 0.1 |
| Other components (part(s) by mass) | BDK | — | — | — | — | — |
|  | IB-XA | — | — | — | — | — |
|  | BZ | — | — | — | — | — |
|  | 1,6-HX-A | — | — | — | — | — |
| Integrated irradiation (mJ/cm2) | — | 4000 | 500 | 1000 | 2000 | 2000 |
| Glass transition temperature (° C.) | — | 250° C. or higher | 250° C. or higher | 250° C. or higher | 250° C. or higher | 250° C. or higher |
| Mass loss on heating of a photopolymerization initiator (% by mass) | — | 14 | 5 | 5 | 5 | 7.1 |
| Mass loss on heating of a cured body (% by mass) | — | 3.6 | 2.6 | 3.7 | 2.5 | 4.1 |
| Adhesion strength (MPa) | — | 2.3 | 3.8 | 4.2 | 3.4 | 3.3 |
| Adhesion strength after a 250° C. heat resistance test (MPa) | — | 7.9 | 9.1 | 10.2 | 10.1 | 8.8 |
| Adhesion strength after a 300° C. heat resistance test (MPa) | — | 8.3 | 9.9 | 10.1 | 10.3 | 8.4 |
| (1) High-pressure mercury lamp | Tensile shear adhesion strength after a dismantlement test [MPa] | 0.1 Delaminatable | 0.1 Delaminatable | 0.1 Delaminatable | 0.1 Delaminatable | 0.1 Delaminatable |
|  | Integrated irradiation of a wavelength of 365 nm [mJ/cm2] | 480000 | 390000 | 280000 | 190000 | 420000 |
|  | Highest temperature of an adhered body [° C.] | 298 | 285 | 265 | 206 | 285 |
| (2) Metal halide lamp | Tensile shear adhesion strength after a dismantlement test [MPa] | 0.1 Delaminatable | 0.1 Delaminatable | 0.1 Delaminatable | 0.1 Delaminatable | 0.1 Delaminatable |
|  | Integrated irradiation of a wavelength of 365 nm [mJ/cm2] | 38000 | 390000 | 350000 | 350000 | 330000 |
|  | Highest temperature of an adhered body [° C.] | 286 | 287 | 273 | 274 | 277 |
| (3) Mercury xenon lamp | Tensile shear adhesion strength after a dismantlement test [MPa] | 0.1 Delaminatable | 0.1 Delaminatable | 0.1 Delaminatable | 0.1 Delaminatable | 0.1 Delaminatable |
|  | Integrated irradiation of a wavelength of 365 nm [mJ/cm2] | 340000 | 340000 | 340000 | 340000 | 340000 |
|  | Highest temperature of an adhered body [° C.] | 250 | 255 | 266 | 276 | 235 |
| (4) Xenon gas-enclosed flash lamp | Tensile shear adhesion strength after a dismantlement test [MPa] | 0.1 Delaminatable | 0.1 Delaminatable | 0.1 Delaminatable | 0.1 Delaminatable | 0.1 Delaminatable |
|  | Integrated irradiation of a wavelength of 365 nm [mJ/cm2] | 20000 | 30000 | 1000 | 2500 | 40000 |
|  | Highest temperature of an adhered body [° C.] | 245 | 285 | 155 | 275 | 276 |
| (5) Xenon lamp | Tensile shear adhesion strength after a dismantlement test [MPa] | 0.1 Delaminatable | 0.1 Delaminatable | 0.1 Delaminatable | 0.1 Delaminatable | 0.1 Delaminatable |
|  | Integrated irradiation of a wavelength of 365 nm [mJ/cm2] |  |  | — |  |  |
|  | Highest temperature of an adhered body [° C.] | 286 | 288 | 274 | 265 | 266 |

TABLE 3

|  |  | Example 11 | Example 12 | Example 13 | Example 14 | Example 15 |
|---|---|---|---|---|---|---|
| Component (A) (part(s) by mass) | M-309 | 10 | 50 | — | — | 50 |
|  | A-201 | — | — | — | — | — |
|  | X-M-201 | — | — | — | — | — |
|  | TMP | — | — | — | — | — |
|  | M-313 | 90 | — | — | — | — |
|  | M-315 | — | 50 | — | — | — |
|  | PE-3A | — | — | 100 | 50 | — |
|  | PE-4A | — | — | — | 50 | — |
|  | M-408 | — | — | — | — | 50 |
|  | M-400 | — | — | — | — | — |
|  | DPE-6A | — | — | — | — | — |
|  | TE-2000 | — | — | — | — | — |
| Component (B) (part(s) by mass) | IRGACURE379 | — | 0.5 | 0.3 | — | — |
|  | IRGACURE127 | — | — | — | — | — |
|  | IRGACURE369 | — | — | — | — | — |
|  | IRGACURE819 | 1 | — | — | 0.1 | 0.05 |
|  | DAROCUR TPO | — | — | — | — | — |
|  | IRGACURE754 | — | — | — | — | — |
| Component (C) (part(s) by mass) | MDP | 0.1 | 0.1 | 0.1 | 0.1 | 0.1 |
| Other components (part(s) by mass) | BDK | — | — | — | — | — |
|  | IB-XA | — | — | — | — | — |
|  | BZ | — | — | — | — | — |
|  | 1,6-HX-A | — | — | — | — | — |
| Integrated irradiation (mJ/cm2) |  | — | 500 | 1000 | 500 | 2000 | 8000 |
| Glass transition temperature (° C.) |  | — | 250° C. or higher | 250° C. or higher | 250° C. or higher | 250° C. or higher | 250° C. or higher |
| Mass loss on heating of a photopolymerization initiator (% by mass) |  | — | 5.5 | 5 | 5 | 5.5 | 5.5 |
| Mass loss on heating of a cured body (% by mass) |  | — | 0.7 | 0.4 | 0.9 | 0.3 | 0.2 |
| Adhesion strength (MPa) |  | — | 4.9 | 4.7 | 2.8 | 3.9 | 2.8 |
| Adhesion strength after a 250° C. heat resistance test (MPa) |  | — | 12.5 | 13.1 | 10.1 | 11.2 | 12.2 |
| Adhesion strength after a 300° C. heat resistance test (MPa) |  | — | 13.1 | 13.5 | 10.5 | 13.1 | 12.5 |
| (1) High-pressure mercury lamp | Tensile shear adhesion strength after a dismantlement test [MPa] | 0.1 Delaminatable | 0.1 Delaminatable | 0.1 Delaminatable | 0.1 Delaminatable | 0.1 Delaminatable |
|  | Integrated irradiation of a wavelength of 365 nm [mJ/cm2] | 470000 | 380000 | 300000 | 200000 | 400000 |
|  | Highest temperature of an adhered body [° C.] | 280 | 274 | 275 | 200 | 265 |
| (2) Metal halide lamp | Tensile shear adhesion strength after a dismantlement test [MPa] | 0.1 Delaminatable | 0.1 Delaminatable | 0.1 Delaminatable | 0.1 Delaminatable | 0.1 Delaminatable |
|  | Integrated irradiation of a wavelength of 365 nm [mJ/cm2] | 25000 | 340000 | 360000 | 340000 | 340000 |
|  | Highest temperature of an adhered body [° C.] | 289 | 285 | 275 | 270 | 270 |
| (3) Mercury xenon lamp | Tensile shear adhesion strength after a dismantlement test [MPa] | 0.1 Delaminatable | DPE-6A | 0.1 Delaminatable | 0.1 Delaminatable | 0.1 Delaminatable |
|  | Integrated irradiation of a wavelength of 365 nm [mJ/cm2] | 330000 | 330000 | 330000 | 33000 | 330000 |
|  | Highest temperature of an adhered body [° C.] | 245 | 254 | 256 | 276 | 245 |
| (4) Xenon gas-enclosed flash lamp | Tensile shear adhesion strength after a dismantlement test [MPa] | 0.1 Delaminatable | 0.1 Delaminatable | 0.1 Delaminatable | 0.1 Delaminatable | 0.1 Delaminatable |
|  | Integrated irradiation of a wavelength of 365 nm [mJ/cm2] | 25000 | 25000 | 2000 | 3500 | 50000 |
|  | Highest temperature of an adhered body [° C.] | 245 | 260 | 150 | 268 | 280 |
| (5) Xenon lamp | Tensile shear adhesion strength after a dismantlement test [MPa] | 0.1 Delaminatable | 0.1 Delaminatable | 0.1 Delaminatable | 0.1 Delaminatable | 0.1 Delaminatable |
|  | Integrated irradiation of a wavelength of 365 nm [mJ/cm2] | — | — | — | — | — |
|  | Highest temperature of an adhered body [° C.] | 265 | 255 | 275 | 277 | 299 |

TABLE 4

| Example No. | | Example 16 | Example 17 | Example 18 | Example 19 |
|---|---|---|---|---|---|
| Component (A) (part(s) by mass) | M-309 | — | 50 | — | 50 |
| | A-201 | — | — | — | — |
| | X-M-201 | — | — | — | — |
| | TMP | — | — | — | — |
| | M-313 | — | — | — | — |
| | M-315 | — | — | — | — |
| | PE-3A | 50 | — | 50 | — |
| | PE-4A | — | — | — | — |
| | M-408 | 50 | — | — | — |
| | M-400 | — | 50 | — | — |
| | DPE-6A | — | — | 50 | — |
| | TE-2000 | — | — | — | 50 |
| Component (B) (part(s) by mass) | IRGACURE379 | — | — | 1 | 1 |
| | IRGACURE127 | — | — | — | — |
| | IRGACURE369 | — | — | — | — |
| | IRGACURE819 | — | — | — | — |
| | DAROCUR TPO | 2 | — | — | — |
| | IRGACURE754 | — | 3 | — | — |
| Component (C) (part(s) by mass) | MDP | 0.1 | 0.1 | 0.1 | 0.1 |
| Other components (part(s) by mass) | BDK | — | — | — | — |
| | IB-XA | — | — | — | — |
| | BZ | — | — | — | — |
| | 1,6-HX-A | — | — | — | — |
| Integrated irradiation (mJ/cm2) | — | 500 | 4000 | 500 | 500 |
| Glass transition temperature (° C.) | — | 250° C. or higher | 250° C. or higher | 250° C. or higher | 250° C. or higher |
| Mass loss on heating of a photopolymerization initiator (% by mass) | — | 4.7 | 14 | 5 | 5 |
| Mass loss on heating of a cured body (% by mass) | — | 0.9 | 4.5 | 0.4 | 0.4 |
| Adhesion strength (MPa) | — | 3.5 | 3.1 | 3.4 | 8.2 |
| Adhesion strength after a 250° C. heat resistance test (MPa) | — | 10.1 | 8.4 | 10.6 | 10.6 |
| Adhesion strength after a 300° C. heat resistance test (MPa) | — | 10.9 | 7.5 | 11.6 | 11.6 |
| (1) High-pressure mercury lamp | Tensile shear adhesion strength after a dismantlement test [MPa] | 0.1 Delaminatable | 0.1 Delaminatable | 0.1 Delaminatable | 0.1 Delaminatable |
| | Integrated irradiation of a wavelength of 365 nm [mJ/cm2] | 450000 | 350000 | 300000 | 100000 |
| | Highest temperature of an adhered body [° C.] | 275 | 265 | 265 | 190 |
| (2) Metal halide lamp | Tensile shear adhesion strength after a dismantlement test [MPa] | 0.1 Delaminatable | 0.1 Delaminatable | 0.1 Delaminatable | 0.1 Delaminatable |
| | Integrated irradiation of a wavelength of 365 nm [mJ/cm2] | 24000 | 240000 | 300000 | 300000 |
| | Highest temperature of an adhered body [° C.] | 280 | 270 | 270 | 270 |
| (3) Mercury xenon lamp | Tensile shear adhesion strength after a dismantlement test [MPa] | 0.1 Delaminatable | 0.1 Delaminatable | 0.1 Delaminatable | 0.1 Delaminatable |
| | Integrated irradiation of a wavelength of 365 nm [mJ/cm2] | 300000 | 300000 | 300000 | 30000 |
| | Highest temperature of an adhered body [° C.] | 240 | 250 | 245 | 290 |
| (4) Xenon gas-enclosed flash lamp | Tensile shear adhesion strength after a dismantlement test [MPa] | 0.1 Delaminatable | 0.1 Delaminatable | 0.1 Delaminatable | 0.1 Delaminatable |
| | Integrated irradiation of a wavelength of 365 nm [mJ/cm2] | 20000 | 20000 | 20000 | 3500 |
| | Highest temperature of an adhered body [° C.] | 279 | 279 | 169 | 255 |
| (5) Xenon lamp | Tensile shear adhesion strength after a dismantlement test [MPa] | 0.1 Delaminatable | 0.1 Delaminatable | 0.1 Delaminatable | 0.1 Delaminatable |
| | Integrated irradiation of a wavelength of 365 nm [mJ/cm2] | — | — | — | — |
| | Highest temperature of an adhered body [° C.] | 244 | 235 | 255 | 287 |

TABLE 5

| Example No. | | Comparative Example 1 | Comparative Example 2 | Comparative Example 3 | Comparative Example 4 |
|---|---|---|---|---|---|
| Component (A) (part(s) by mass) | M-309 | — | — | 100 | — |
| | A-201 | — | — | — | — |
| | X-M-201 | — | — | — | — |
| | TMP | — | — | — | — |
| | M-313 | — | — | — | — |
| | M-315 | — | — | — | — |
| | PE-3A | — | — | — | — |
| | PE-4A | — | — | — | — |
| | M-408 | — | — | — | — |
| | M-400 | — | — | — | — |
| | DPE-6A | — | — | — | — |
| | TE-2000 | — | — | — | — |
| Component (B) (part(s) by mass) | IRGACURE379 | 3 | 3 | — | 3 |
| | IRGACURE127 | — | — | — | — |
| | IRGACURE369 | — | — | — | — |
| | IRGACURE819 | — | — | — | — |
| | DAROCUR TPO | — | — | — | — |
| | IRGACURE754 | — | — | — | — |
| Component (C) (part(s) by mass) | MDP | 0.1 | 0.1 | 0.1 | 0.1 |
| Other components (part(s) by mass) | BDK | — | — | 5 | — |
| | IB-XA | 100 | — | — | — |
| | BZ | — | 100 | — | — |
| | 1,6-HX-A | — | — | — | 100 |
| Integrated irradiation (mJ/cm2) | | — | 1000 | 1000 | 1000 | 1000 |
| Glass transition temperature (° C.) | | — | 93 | 55 | The specimen was broken during measurement. | 63 |
| Mass loss on heating of a photopolymerization initiator (% by mass) | | — | 5 | 5 | 92 | 5 |
| Mass loss on heating of a cured body (% by mass) | | — | 11 | Not cured | 11 | 5.9 |
| Adhesion strength (MPa) | | — | 8.9 | | 2.9 | 3.9 |
| Adhesion strength after a 250° C. heat resistance test (MPa) | | — | 0 | | 0 | 0 |
| Adhesion strength after a 300° C. heat resistance test (MPa) | | — | 0 | | 0 | 0 |
| (1) High-pressure mercury lamp | Tensile shear adhesion strength after a dismantlement test [MPa] Integrated irradiation of a wavelength of 365 nm [mJ/cm2] Highest temperature of an adhered body [° C.] | A test was not done because delamination was caused by exposure to a 300° C. oven. | A test was not done because delamination was caused by exposure to a 300° C. oven. | A test was not done because delamination was caused by exposure to a 300° C. oven. | A test was not done because delamination was caused by exposure to a 300° C. oven. |
| (2) Metal halide lamp | Tensile shear adhesion strength after a dismantlement test [MPa] Integrated irradiation of a wavelength of 365 nm [mJ/cm2] Highest temperature of an adhered body [° C.] | | | | |
| (3) Mercury xenon lamp | Tensile shear adhesion strength after a dismantlement test [MPa] Integrated irradiation of a wavelength of 365 nm [mJ/cm2] Highest temperature of an adhered body [° C.] | | | | |
| (4) Xenon gas-enclosed flash lamp | Tensile shear adhesion strength after a dismantlement test [MPa] Integrated irradiation of a wavelength of 365 nm [mJ/cm2] Highest temperature of an adhered body [° C.] | | | | |
| (5) Xenon lamp | Tensile shear adhesion strength after a dismantlement test [MPa] Integrated irradiation of a wavelength of 365 nm [mJ/cm2] Highest temperature of an adhered body [° C.] | | | | |

An effect that the adhesive composition of the present invention is high in heat resistance and adhesiveness can be obtained. As to the adhesiveness between substrates adhered with the adhesive composition of the present invention, an effect that adhesiveness will not decrease with use in an environment of 250° C. or higher can be obtained. An effect that cured bodies of the adhesive composition of the present invention will emit little outgas with exposure at 300° C. can be obtained.

INDUSTRIAL APPLICABILITY

The (meth)acrylic resin composition of the present invention is superior in workability and productivity in the production of various electronic components, optical components and optical devices because it will exhibit high adhesiveness easily by only applying ultraviolet rays or visible light. Moreover, cured bodies of the (meth)acrylic resin composition of the present invention does not decrease in adhesiveness even at a high temperature of 250° C. and they also emit very little outgas even at such a high temperature. Therefore, various electronic components, optical components, and optical devices adhered with the (meth)acrylic resin composition of the present invention can be used even when deposition treatment at high temperatures over 200° C. or baking finish at high temperatures is performed.

Besides electronic components, such as IC, resistors, and inductors, optical components, such as image sensors, have come to be provided with surface mounting to their circuit boards and in such events components are made to pass through solder reflow of high temperature. In recent years, the temperature condition of solder reflow has been becoming stricter particularly with shift to lead-free solders. In such a production process, in order to improve the quality of optical components or optical devices or in order to increase productivity and production yield, parts with use of a photocurable resin composition are required to sufficiently withstand high temperature heating treatment. Optical components and optical devices produced using the (meth)acrylic resin composition of the present invention are very useful industrially because they can sufficiently withstand the high temperature heating treatment.

The invention claimed is:

1. A (meth)acrylic resin composition comprising:
   (A) a polyfunctional (meth)acrylate, and
   (B) a photopolymerization initiator that exhibits a mass loss on heating of 15% by mass or less when increasing temperature from 30° C. to 250° C. at a temperature increase rate of 10° C./min. under nitrogen flow,
   wherein the glass transition temperature of a cured body obtained from the (meth)acrylic resin composition is 250° C. or higher.

2. The (meth)acrylic resin composition according to claim 1,
   wherein the polyfunctional (meth)acrylate (A) is one or more members selected from the group consisting of 1,3-adamantyl dimethanol di(meth)acrylate, trimethylolpropane tri(meth)acrylate, isocyanuric acid ethylene oxide modified di(meth)acrylate, isocyanuric acid ethylene oxide modified tri(meth)acrylate, pentaerythritol tri(meth)acrylate, pentaerythritol tetra(meth)acrylate, dimethylolpropane tetra(meth)acrylate, dipentaerythritol penta(meth)acrylate, dipentaerythritol hexa(meth) acrylate, and 1,2-polybutadiene-terminated urethane (meth)acrylate.

3. The (meth)acrylic resin composition according to claim 2,
   wherein the polyfunctional (meth)acrylate (A) consists of trimethylolpropane tri(meth)acrylate, and a mixture of isocyanuric acid ethylene oxide modified di(meth)acrylate and isocyanuric acid ethylene oxide modified tri (meth)acrylate.

4. The (meth)acrylic resin composition according to claim 3,
   wherein the mixture of isocyanuric acid ethylene oxide modified di(meth)acrylate and isocyanuric acid ethylene oxide modified tri(meth)acrylate comprises 20-50% by mass of the isocyanuric acid ethylene oxide modified di(meth)acrylate.

5. The (meth)acrylic resin composition according to claim 3,
   wherein in the polyfunctional (meth)acrylate (A), a mass ratio of the trimethylolpropane tri(meth)acrylate to the mixture of isocyanuric acid ethylene oxide modified di(meth)acrylate and isocyanuric acid ethylene oxide modified tri(meth)acrylate is in the range of 3/97 to 70/30.

6. The (meth)acrylic resin composition according to claim 1,
   wherein the polyfunctional (meth)acrylate (A) accounts for 90% by mass or more in the (meth)acrylic resin composition.

7. The (meth)acrylic resin composition according to claim 1,
   wherein the mass loss on heating of a cured body obtained from the (meth)acrylic resin composition is 6% by mass or less when the cured body is left at rest at 300° C. for 10 minutes under helium flow.

8. The (meth)acrylic resin composition according to claim 1,
   wherein the (meth)acrylic resin composition comprises 0.01 to 5 parts by mass of the photopolymerization initiator (B) relative to 100 parts by mass of the polyfunctional (meth)acrylate (A).

9. The (meth)acrylic resin composition according to claim 1,
   wherein the photopolymerization initiator (B) is one or more members selected from the group consisting of 2-hydroxy-1-{4-[4-(2-hydroxy-2-methyl-propionyl)-benzyl]-phenyl}-2-methyl-propan-1-one, 2-benzyl-2-dimethylamino-1-(4-morpholinophenyl)butanone-1,2-dimethylamino-2-(4-methyl-benzyl)-1-(4-morpholin-4-yl-phenyl)-butan-1-one, bis(2,4,6-trimethylbenzoyl) phenylphosphine oxide, 2,4,6-trimethylbenzoyldiphenylphosphine oxide, oxy-phenyl-acetic acid 2-[2-oxo-2-phenyl-acetoxy-ethoxy]-ethyl ester, and oxy-phenyl-acetic acid 2-[2-hydroxy-ethoxy]-ethyl ester.

10. The (meth)acrylic resin composition according to claim 1, further comprising (C) a polymerization inhibitor.

11. An adhesive comprising the (meth)acrylic resin composition according to claim 1.

12. A method for producing an adhered body, comprising putting substrates together using the adhesive according to claim 11, and adhering the substrates to each other by irradiating the adhesive with visible light or ultraviolet light.

13. A method of using an adhered body, comprising putting substrates together and adhering the substrates to each other with the adhesive according to claim 11, and then using a resulting adhered body in an environment of 250° C. or higher.

14. A method for dismantling an adhered body, comprising irradiating light with a wavelength of 280 nm or longer to an adhered body produced by adhering substrates to each other with the adhesive according to claim 11 while heating the adhered body at 150° C. or higher.

15. The method for dismantling an adhered body according to claim 14, wherein the source of the irradiated light is selected from the group consisting of a high pressure mercury lamp, an ultrahigh pressure mercury lamp, a metal halide lamp, a xenon lamp, and a xenon gas-enclosed flash lamp.

* * * * *